(12) United States Patent
Yamamoto et al.

(10) Patent No.: US 6,330,101 B1
(45) Date of Patent: Dec. 11, 2001

(54) EC PANEL DRIVE UNIT FOR A REAR-VIEW MIRROR

(75) Inventors: Tetsuya Yamamoto, Iwata; Mitsuyoshi Nagao; Hidenori Sato, both of Fujieda; Yoshihiro Fujikawa, Toyota, all of (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 09/427,603

(22) Filed: Oct. 27, 1999

(30) Foreign Application Priority Data

Nov. 12, 1998 (JP) .................................................. 10-322179

(51) Int. Cl.[7] .............................. G02F 1/153; G02B 17/00
(52) U.S. Cl. ........................ 359/267; 359/265; 359/604; 345/49; 345/105
(58) Field of Search .................................... 359/265–275, 359/602–604; 345/49, 105

(56) References Cited

U.S. PATENT DOCUMENTS 5,581,406 * 12/1996 Kobayashi et al. .................. 359/604

FOREIGN PATENT DOCUMENTS 6-60540 8/1994 (JP) .
H10-150825 6/1998 (JP) .

* cited by examiner

Primary Examiner—Georgia Epps
Assistant Examiner—Evelyn A. Lester
(74) Attorney, Agent, or Firm—Michael J. Striker

(57) ABSTRACT

An EC panel drive unit for a rear-view mirror comprising a timer circuit 2 in which a drive signal is output for a fixed period of time when either a colored state switch SW1 or a colorless state switch SW2 is in the ON position; a D-type flip-flop circuit 9 that sends different output signals, depending on whether the colored state switch SW1 is in the ON position or the colorless state switch SW2 is in the ON position, and a colored/colorless state switching circuit 6 which switches the polarity of DC voltage that is output from a lithium battery based on the output from the D-type flip-flop circuit 9 and then applies the voltage to input terminals Ta and Tb of the EC panel 7. A contact SW2-3 is installed between the two input terminals, Ta and Tb, of the EC panel 7 for providing a short circuit between the two terminals when the colorless state switch SW2 is turned to the ON position. Switching between a colored state and a colorless state by a one-touch operation, and returning the EC panel 7 to the colorless state from the colored state by pressing and holding the colorless state switch SW3 in cases where trouble occurs such as a drop in output voltage from the lithium battery 1 so as to set the contact SW3-3 to a short-circuit state can be achieved.

8 Claims, 3 Drawing Sheets

EC PANEL DRIVE UNIT FOR A REAR-VIEW MIRROR

BACKGROUND OF THE INVENTION

1. Technical Field

The present invention relates to an electrochromic panel (EC panel) in which it is possible to alternate between a colored state and a colorless state when the panel is installed onto a rear-view mirror of a vehicle and a DC voltage polarity is applied in an inverted fashion. More specifically, the present invention pertains to a drive unit that provides a fail-safe function as well as an easy one-touch operation for alternating between the colored and colorless states.

2. Description of Prior Art

For example, when a passenger vehicle or a truck is driven at night, there are several cases in which the light beams from the head lamps of following vehicles reflect against the rear-view mirrors (both internal and external) and enter the driver's field of view, causing the driver to experience temporary blindness. Therefore, in order to solve such a problem EC panels (electrochromic panels) have been conventionally installed onto the glass substrates used for rear-view mirrors, and by applying a DC voltage to the EC panels, it has become possible to reduce the reflectivity and prevent this temporary blindness from occurring.

FIG. 3 shows one of conventional circuits that has been used as a drive circuit for EC panels, and by applying a switchable DC voltage polarity outputted from a DC power source 12 to the input terminal of an EC panel 11 as shown in FIG. 3, it is possible to obtain a blindness prevention state (hereinafter referred to as the colored state) by reducing the reflectivity of the rear-view mirror, as well as return the rear-view mirror from this colored state to its original state of reflectivity (hereinafter referred to as the colorless state).

In other words, through the operation of a two-way switch 13 (13-1 and 13-2) as shown in FIG. 3, connections are made between contacts 13-1c and 13-1a, as well as between contacts 13-2c and 13-2a, such that voltage is applied in a forward direction to the input terminal of the EC panel 11, making it possible for the EC panel 11 to be in the colored state whereby the reflectivity is reduced. Conversely, by operating the switch 13 in a reverse fashion such that connections are made between contacts 13-1c and 13-1b, as well as between contacts 13-2c and 13-2b, the voltage is applied in a reverse direction to the input terminal of the EC panel 11, causing it to return to its colorless state. Accordingly, through the operation of this switch 13, the driver can change the reflectivity of a rear-view mirror and thus prevent temporary blindness from occurring as a result of light beams from the head lamps of following vehicles being reflected against the rear-view mirror during night driving.

However, since the use of the aforementioned EC panel drive circuit makes it necessary for the driver to press and hold the two-way switch 13 for a set period of time in order to change the EC panel 11 to and from the colored and colorless states, this operation may be burdensome for the driver. That is to say, the disadvantage here is that once the voltage is applied to the EC panel 11, it does not immediately change it to either the colored or colorless state, but rather, it gradually changes to or from either state through the application of voltage in a forward or reverse direction for a set period of time, thus making it necessary for the driver to press and hold the two-way switch 13.

Furthermore, since a two-way switch 13 is used in the case of the EC panel drive circuit shown in FIG. 3 in order to switch the EC panel 11 back and forth between the colored and colorless states, it is impossible for a fail-safe function to actuate in cases where errors occur during the operation of the switch.

A detailed explanation of this is given below. Given the colored state of the EC panel 11, in which case the reflectivity of the rear-view mirror is reduced, operating the switch 13 so that connections are made between contacts 13-1c and 13-1b as well as between contacts 13-2c and 13-2b will cause the EC panel 11 to return to its colorless state. When a problem occurs in this case, namely, a drop in the level of voltage from the DC power source 12, it becomes impossible for the EC panel 11 to return to the colorless state from the colored state.

Thus, in comparing the safety between the colored state and the colorless state of the EC panel 11, it is apparent that the colorless state is the safer of the two. Therefore, when considering a fail-safe function in the case where a failure has occurred, the colorless state of the EC panel 11 is preferable. However, as noted above, in conventional cases of drive units used for the EC panel 11 in which a drop has occurred in the level of the voltage supplied from the DC power source 12, there occurs a problem that the EC panel 11 has become frozen in the colored state, and a fail-safe function which would allow the EC panel to return to its original state has not been realized.

In addition, a characteristic of the EC panel 11 is a change in the level of color in response to the amount of DC voltage applied. However, in the case of the EC panel drive unit shown in FIG. 3, the value of the voltage level applied to the EC panel 11 is fixed, and as a result, the level of color is always fixed. Accordingly, the disadvantage here is not only that the driver is unable to set the reflectivity of the rear-view mirror to a desired level, but also that it is impossible to change the reflectivity in response to the brightness of the surroundings.

As described above, in conventional drive units for EC panels, it is necessary to press and hold a two-way switch 13 in order to change the EC panel 11 to the colored state as well as to the colorless state, and this is a disadvantage from the standpoint of operation.

Furthermore, since no fail-safe function, such as the ability for the EC panel 11 to return to the colorless state in the case where there is a drop in the level of voltage from the DC power source 12 when the EC panel 11 is in the colored state, is available, the loss in the level of safety is a disadvantage. Also, since the value of the voltage applied to the EC panel 11 is fixed, the problem of the reflectivity of the rear-view mirror not being able to be set to a desired level has occurred.

This invention is designed to solve these conventional problems, and its objective is to obtain the ability to switch an EC panel back and forth between a colored state and a colorless state using a one-touch operation. Furthermore, the present invention makes it possible to achieve a fail-safe function and provide an EC panel drive unit for rear-view mirrors in which the reflectivity can be changed.

SUMMARY OF THE INVENTION

In one of the preferred aspects, the EC panel drive unit for rear-view mirrors according to the present invention comprises a colored state switch SWI that turns to the ON position instantaneously, at which point a one-shot multivibrator 8 puts out an output signal which turns a first transistor Tr1 to the ON position for a fixed period of time. Also, when a contact SW1-2 of the colored state switch SW1 turns to the ON position, a fifth transistor Tr5 and an eighth transistor Tr8 also turn to the ON position due to the fact that the "Q2" of a D-type flip-flop circuit 9 is at the H-level while the "$\overline{Q2}$" is at the L-level. Accordingly, voltage is applied such that the Ta terminal of an EC panel 7 is on the positive side and the Tb terminal is on the negative side, resulting in a colored state for the EC panel 7.

Also, if a colorless state switch SW2 is turned to the ON position instantaneously when the EC panel 7 is in the colored state, the one-shot multi-vibrator 8 puts out an output signal which turns the first transistor Tr1 to the ON position for a fixed period of time. Furthermore, when a contact SW2-2 of the colorless state switch SW2 turns to the ON position, a sixth transistor Tr6 and a seventh transistor Tr7 also turn to the ON position due to the fact that the "Q2" of the D-type flip-flop circuit 9 is at the L-level while the "$\overline{Q2}$" is at the H-level. Accordingly, a voltage is applied such that the Tb terminal of the EC panel 7 is on the positive side and the Ta terminal is on the negative side, resulting in a colorless state for the EC panel 7.

In addition, even in cases where it becomes impossible for whatever reason to apply a DC voltage to the EC panel 7 when it is in the colored state, it is still possible to obtain a short-circuit condition between the two input terminals Ta and Tb of the EC panel 7 by pressing and holding the colorless state switch SW2, which turns a contact SW-3 to the ON position. In doing so, it is possible to switch the EC panel 7 from the colored state to the colorless state. Accordingly, a fail-safe function can be achieved.

BEST MODE FOR CARRYING OUT THE INVENTION

Figure 1:
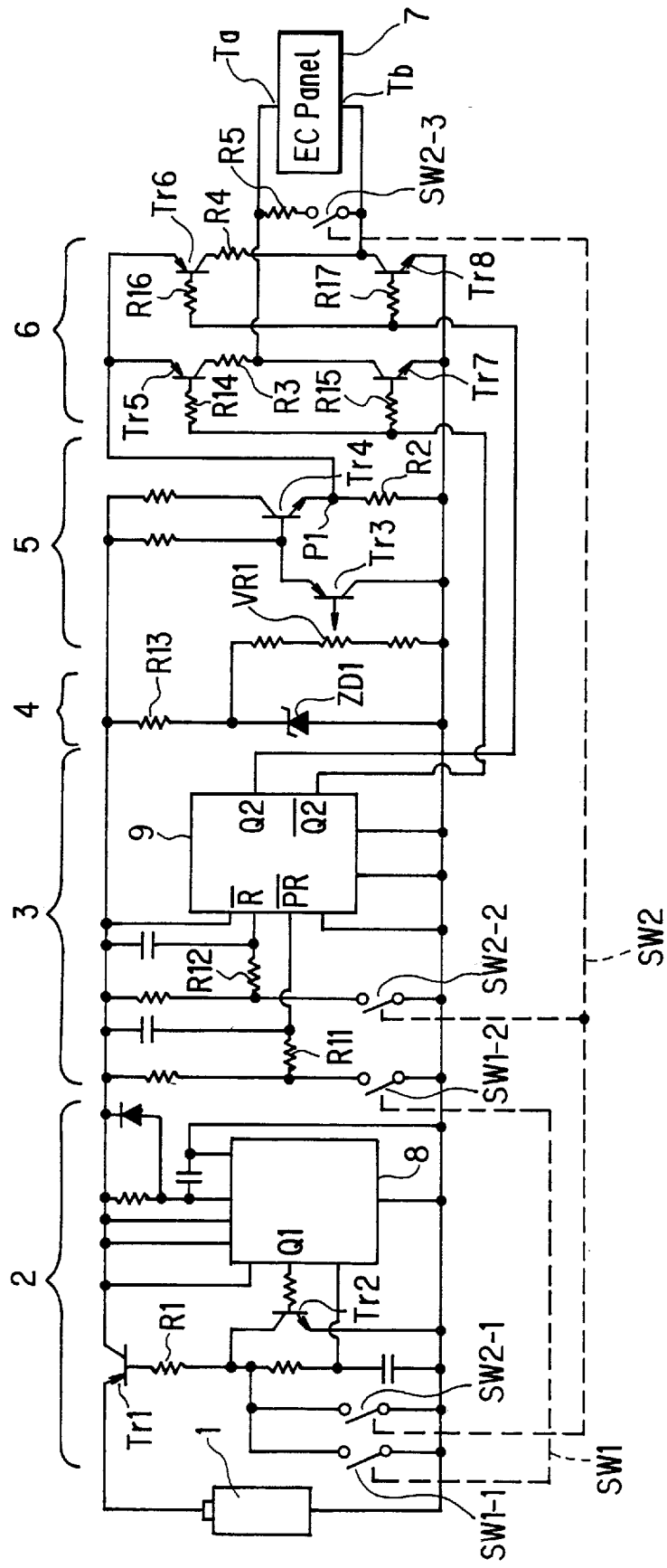
FIG. 1 is a circuit diagram showing an EC panel drive unit for a rear-view mirror according to an aspect of the present invention.

An embodiment of the present invention is described below with reference to the drawings. FIG. 1 is a circuit diagram showing a configuration of an EC panel drive unit for a rear-view mirror according to one aspect of the present invention. With this drive unit, a DC voltage that is supplied from a lithium battery 1 which is used as a direct voltage source is applied in the form of a reversible polarity to two terminals for the EC panel 7, namely Ta (first terminal) and Tb (second terminal). Accordingly, the colored state or the colorless state of the EC panel 7 is determined, and this makes it possible for the reflectivity of the rear-view mirror to be changed.

As shown in FIG. 1, this drive unit comprises a lithium battery 1, a timer circuit 2, a colored/colorless state control circuit 3, a constant-voltage circuit 4, a variable voltage circuit 5, and a colored/colorless state switching circuit 6. Direct voltage is applied to the two input terminals for the EC panel 7, terminals Ta and Th, such that the polarity can be switched.

The timer circuit 2 contains a first transistor Tr1 that is connected to the positive side of the lithium battery 1, a one-shot multi-vibrator 8 that is installed on the post-deflection side of the first transistor Tr1, and a contact SW1-1 for a colored state switch SW1 (two-way type) as well as a contact SW2-1 for a colorless state switch SW2 (three-way type), both of which are connected in a parallel fashion to the base of the first transistor Tr1 through a resistor R1. This circuit also contains a second transistor Tr2 which is connected between one end of the resistor R1 and the negative pole of the lithium battery 1, and the base of this second transistor Tr2 is connected to the "Q1" output of the one-shot multi-vibrator 8.

The colored/colorless state control circuit 3 comprises a D-type flip-flop circuit 9 and a contact SW1-2 for the colored state switch SW1 as well as a contact SW2-2 for the colorless state switch SW2. The contact SW1-2 is connected to a "$\overline{PR}$" terminal of the D-type flip-flop circuit 9 through a resistor R11 while the other contact SW2-2 is connected to an "R" terminal of the D-type flip-flop circuit 9 through a resistor R12. Furthermore, "Q2" and "$\overline{Q2}$" terminals of the D-type flip-flop circuit 9 are connected to the respective colored and colorless state switching circuits 6 as described below.

The constant-voltage circuit 4 consists of a series connection circuit between a Zener diode ZD1 and a resistor R13, and a fixed level of voltage is generated at both ends of the Zener diode ZD1.

The variable voltage circuit 5 contains a third transistor Tr3, a fourth transistor Tr4 and a variable resistor VR1. The variable resistor VR1 is installed onto the Zener diode ZD1 in a parallel fashion, and a movable contact of this variable resistor VR1 is connected to the base of the third transistor Tr3. By adjusting the position of the movable contact of the variable resistor VR1, it is possible to change the voltage that is generated at the base of the third transistor Tr3. Thus, the voltage value that flows between the emitter and collector of the third transistor Tr3 can be changed.

Furthermore, the emitter of the third transistor Tr3 is connected to the base of the transistor Tr4, and accordingly, the current that flows to the third transistor Tr3 is amplified before it flows between the collector and emitter of the fourth transistor Tr4. A resistor R2 is installed between the emitter for the fourth transistor Tr4 and the negative pole of the lithium battery 1, and the voltage that is generated at both ends of this resistor R2 is supplied to the post-deflection colored/colorless state switching circuit 6.

The colored/colorless state switching circuit 6 consists of a parallel connection circuit for the series connection between a fifth transistor Tr5 and a seventh transistor Tr7 as well as for the series connection between a sixth transistor Tr6 and an eighth transistor Tr8. Among these, the fifth and sixth, that is Tr5 and Tr6, are PNP type transistors, while the seventh and eighth, that is Tr7 and Tr8, are NPN type transistors.

The base of the fifth transistor Tr5 as well as that of the seventh transistor Tr7 are connected to the "$\overline{Q2}$" output of the D-type flip-flop circuit 9 through resistors R14 and R15, respectively. Also, the base of the sixth transistor Tr6 as well as that of the eighth transistor Tr8 are connected to the "Q2" output of the D-type flip-flop circuit 9 through resistors R16 and R17, respectively.

Furthermore, a resistor R3 is installed between the fifth transistor Tr5 and the seventh transistor Tr7, and one end of the resistor R3 is connected to an input terminal (first terminal) Ta of the EC panel (electrochromic panel) 7. In the same fashion, a resistor R4 is installed between the sixth transistor Tr6 and the eighth transistor Tr8, and one end of the resistor R4 is connected to an input terminal (second terminal) Tb of the EC panel 7.

In addition, a contact SW2-3 (short-circuit switch) for the colorless state switch SW2 is installed between the two input terminals, Ta and Tb; of the EC panel 7 through a resistor R5, and when the contact SW2-3 is turned to the ON position, a short circuit occurs between these two input terminals via the resistor R5.

Figure 2:
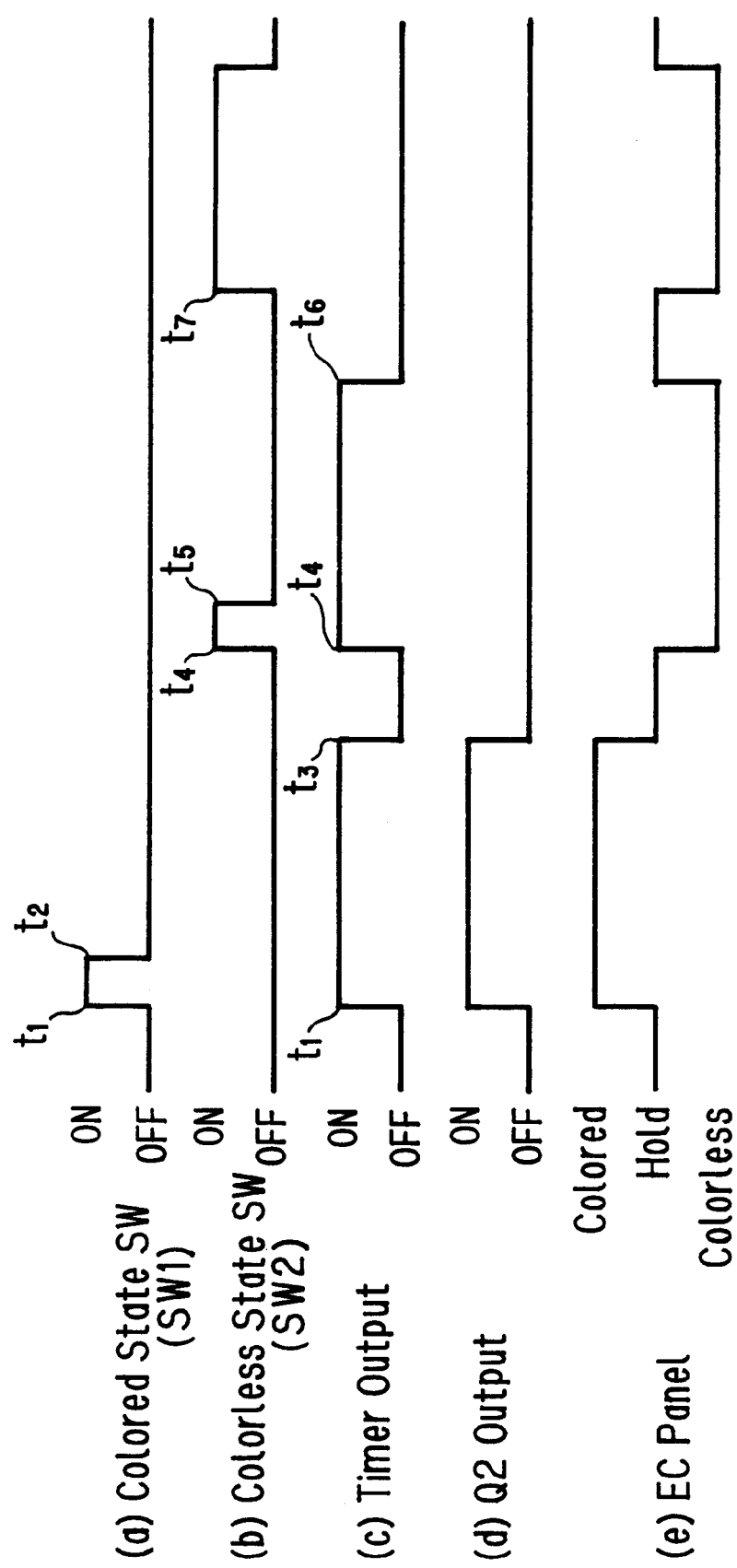
FIG. 2 is a timing chart showing an operation of the EC panel drive unit for a rear-view mirror shown in FIG. 1.
Figure 3:
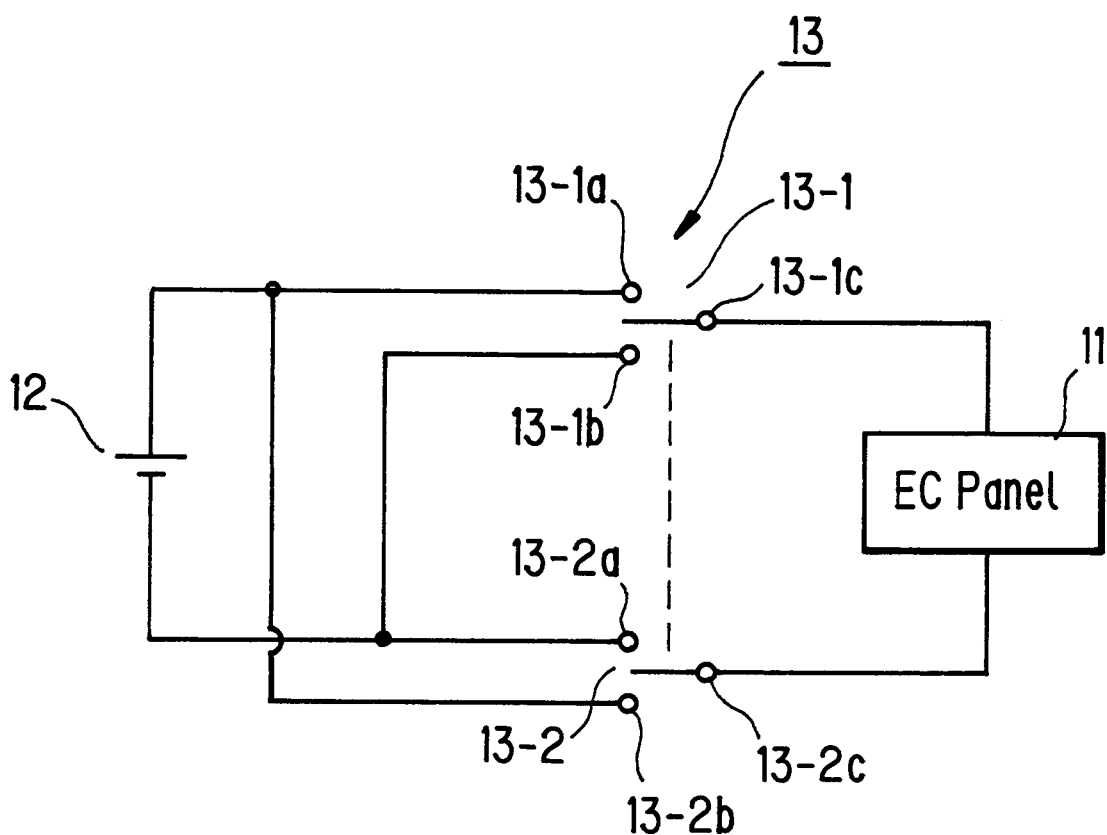
FIG. 3 is a circuit diagram showing a conventional EC panel drive unit for a rear-view mirror

Next, the operation of the embodiment, which is composed according to the above description, will be explained referring to the timing chart shown in FIG. 2. In this example, the colored state switch SW1 turns to the ON position instantaneously in order to reduce the reflectivity of the rear-view mirror when the light from the head lamps of a following vehicle becomes bright (see FIG. 2, t1). While the colored state switch SW1 is in the ON position (t1–t2), the base of the first transistor Tr1 becomes connected to the ground (negative pole of the lithium battery 1) through the resistor R1 and the contact SW1-1, which causes voltage to be applied across the emitter and base of the first transistor Tr1. Accordingly, the transistor Tr1 turns to the ON position, and voltage of the lithium battery 1 is applied to the post-deflection side of the first transistor Tr1.

As a result, voltage is supplied to the power source input terminal of the one-shot multivibrator 8, and the output "Q1" of the one-shot multi-vibrator 8 is at the H-level for a fixed period of time. Only during this time (see FIG. 2, t1–t3) does the second transistor Tr2 turn to the ON position, and since this transistor Tr2 is connected to the contact SW1-1 in a parallel fashion, this becomes a holding circuit with respect to the contact SW1-1. Thus, the first transistor Tr1 is held in the ON position for a fixed period of time.

Furthermore, while the first transistor Tr1 is in the ON position, a voltage is supplied from the lithium battery 1 to a constant-voltage circuit 4, causing a fixed voltage to be generated at both ends of the Zener diode ZD1. Also, a variable resistor VR1 is installed in a parallel fashion with this Zener diode ZD1, and since the movable contact of this variable resistor VR1 is connected to the base of the third transistor Tr3, in addition to the fact that the emitter of the third transistor Tr3 is connected to the base of the fourth transistor Tr4, a fixed voltage is generated across both ends of the resistor R2 according to the position of the movable contact of the variable resistor VR1. This fixed voltage is then supplied to the colored/colorless state switching circuit 6.

On the other hand, the contact SW1-2 of the colored state switch SW1 which is installed within the colored/colorless state control circuit 3 is turned to the ON position, causing a signal to be input to the "$\overline{PR}$" terminal of the D-type flip-flop circuit 9, resulting in an output "Q2" of the D-type flip-flop circuit 9 at the H-level (see FIG. 2(d)) and a "$\overline{Q2}$" at the L-level. Accordingly, an L-level signal is applied to the bases of the fifth and seventh transistors, Tr5 and Tr7, which belong to the colored/colorless state switching circuit 6, and an H-level signal is applied to the bases of the sixth and eighth transistors, Tr6 and Tr8, which also belong to the colored/colorless state switching circuit 6. As a result, the fifth transistor Tr5 (PNP type) and the eighth transistor Tr8 (NPN type) turn to the ON position, while the sixth transistor Tr6 PNP type) and the seventh transistor Tr7 (NPN type) turn to the OFF position.

Based on the above, the P1 end of the resistor R2 is connected to the ground (negative pole of the lithium battery 1) via the point P1, the fifth transistor Tr5, the resistor R3, the terminal Ta, the EC panel 7, the terminal Tb, and the eighth transistor Tr8. This allows current to flow along this path, and when this occurs, the (forward direction) voltage that moves toward the side of the input terminal Th from the side of the input terminal Ta is applied to the EC panel 7, causing the EC panel 7 to turn to the colored state. This results in a drop in the reflectivity of the rear-view mirror that is installed onto the EC panel 7, thus making it possible to prevent the driver from experiencing temporary blindness.

After this, if the timer circuit output ("Q1" output of the one-shot multi-vibrator 8) turns to the OFF position (see FIG. 2, t3), the first transistor Tr1 also turns to the OFF position, which halts the supply of voltage to the colored/colorless state switching circuit 6 and causes the voltage level across the two terminals, Ta and Tb, of the EC panel 7 to equal zero. At this point, the colored state of the EC panel 7 is maintained.

In other words, given a simple operation whereby the driver can instantaneously turn the colored state switch SW1 to the ON position, it is possible to lower the reflectivity of the rear-view mirror and prevent the occurrence of temporary blindness caused by the light beams from the head lamps of following vehicles.

Next, in the case where the EC panel 7 in its colored state is to be returned to its original (colorless) state, the driver can instantaneously turn the colorless state switch SW2 to the ON position (see FIG. 2, t4–t5), which causes the contact SW2-1 to also turn to the ON position. As a result, the operation of the timer circuit 2 turns the first transistor Tr1 to the ON position for a fixed period of time (t4–t6), and the post-deflection side of the transistor Tr1 receives the power supply voltage from the lithium battery 1.

Since the contact SW2-2 of the colorless state switch SW2 is then turned to the ON position, a signal is inputted to the "$\overline{R}$" terminal of the D-type flip-flop circuit 9, and the output "Q2" of the D-type flip-flop circuit 9 is at the L-level while the "$\overline{Q2}$" is at the H-level.

Accordingly, an H-level signal is applied to the bases of the fifth transistor Tr5 and the seventh transistor Tr7, while an L-level signal is applied to the bases of the sixth transistor Tr6 and the eighth transistor Tr8. As a result, contrary to the case in which the panel is in the colored state, the sixth transistor Tr6 (PNP type) and seventh transistor Tr7 (NPN type) are both turned to the ON position, and the fifth transistor Tr5 (PNP type) and eighth transistor Tr8 (NPN type) are both turned to the OFF position.

Therefore, the P1 end of the resistor R2 is connected to the ground (negative pole of the lithium battery 1) via the point P1, the sixth transistor Tr6, the resistor R4, the terminal Tb, the EC panel 7, the terminal Ta, and the seventh transistor Tr7. This allows current to flow along this path, and when this occurs, the (reverse direction) voltage that moves toward the side of the input terminal Ta from the side of the input terminal Tb is applied across the EC panel 7, causing the EC panel 7 to turn to the colorless state. This results in a return to the original reflectivity of the rear-view mirror that is installed onto the EC panel 7.

After this, once the fixed amount of time elapses and the output of the timer circuit 2 turns to the OFF position (see FIG. 2, t6), the first transistor Tr1 also turns to the OFF position. In addition, the colorless state of the EC panel 7 is maintained. Accordingly, through a simple operation in which the colorless state switch SW2 can be instantaneously turned to the ON position, it is possible for the driver to return the colored EC panel 7 to its colorless state.

In cases, for example, where the energy from the lithium battery 1 that is used as a DC power source has been consumed, resulting in the inability to produce a specified level of voltage, normal operation of the one-shot multivibrator 8, the D-type flip-flop circuit 9, etc., may no longer be possible. In such cases, direct voltage can no longer be supplied across the input terminals Ta and Tb of the EC panel 7, and as a result, the EC panel 7 may be frozen in either the colored or colorless state, depending on which state it is in when the power supply is cut off. When the EC panel 7 is frozen in its colored state, there is a loss of safety due to the fact that it cannot be returned to its colorless state.

As such, according to this embodiment, while the colorless state switch SW2 is in the ON position (see FIG. 2, t7), the contact SW2-3 which is installed between the two terminals, Ta and Tb, of the EC panel 7 is also in the ON position, which causes a short circuit between both terminals and results in a gradual loss of color from the EC panel 7. In other words, even when the reverse direction voltage (which makes the Tb terminal side the positive pole) can no longer be applied to the EC panel 7 for whatever reason, pressing and holding the colorless state switch SW2 will make it possible to return the EC panel 7 to its colorless state, thus maintaining an extremely high level of safety.

In doing so, the EC panel drive unit for rear-view mirrors according to this embodiment makes it possible to switch the EC panel 7 back and forth between a colored state and a colorless state through a simple push-button operation of the colored state switch SW1 and the colorless state switch SW2. Thus, it is no longer necessary to go through the trouble of pressing and holding a switch for a fixed period of time as in the case of conventional devices, and it becomes possible to improve the overall operational performance.

Furthermore, since a constant-voltage circuit 4 is equipped with the Zener diode ZD1, it is usually possible to supply a fixed level of voltage to the EC panel 7 even in cases where fluctuations occur in the DC voltage supplied from the lithium battery 1, and this makes it possible to stably switch the EC panel 7 back and forth between the colored and colorless states.

In addition, since the composition of the unit allows for settings to be made to the value of the voltage level that is supplied to the EC panel 7 through the use of the variable resistor VR1, it is possible to set the color on the EC panel 7 to the desired level, which means that the reflectivity of the rear-view mirror can be adjusted to suit the driver's preference.

Through the operation of the timer circuit 2, once the colored state switch SW1 or the colorless state switch SW2 has been pressed, the first transistor Tr1 is designed to be cut off after a set period of time has elapsed, making it possible to control the amount of electricity consumption of the lithium battery 1.

Since the contact (SW2-3) which operates in association with the colorless state switch SW2 through the resistor R5 has been installed between the two input terminals, Ta and Tb, of the EC panel 7, it is possible to return the EC panel 7 to the colorless state from the colored state by pressing and holding the colorless state switch SW2 even in cases where problems, such as a drop in DC voltage, etc., occur so that a fail-safe function can be provided.

What is claimed is:

1. An Electrochromic (EC) panel drive unit for a rear-view mirror which controls the driving operation of an EC panel used for rear-view mirror with a first terminal and a second terminal, such that a DC voltage is applied in a forward direction to said first terminal and said second terminal in order to obtain a colored state for said EC panel, and conversely, said DC voltage is applied in a reverse direction to said first terminal and said second terminal in order to obtain a colorless state for said EC panel, said EC panel drive unit comprising:

a first switch as well as a second switch;

a timer circuit which emits an output signal once said first switch or said second switch is turned to the ON position and remains in the ON position for a set period of time; and switching means which apply said DC voltage in a forward direction across said first terminal and said second terminal while the output signal is being outputted from said timer circuit in the case where said first switch is turned to the ON position, and which apply said DC voltage in a reverse direction across said first terminal and said second terminal while the output signal is being outputted from said timer circuit in the case where said second switch is turned to the ON position, said switching means being composed of four semiconductor elements, having a flip-flop circuit which supplies an ON/OFF switching signal for said semiconductor elements through the ON/OFF operation of said first switch and said second switch.

2. An Electrochromic (EC) panel drive unit for a rear-view mirror as defined in claim 1, wherein said semiconductor elements are composed of transistors.

3. An Electrochromic (EC) panel drive unit for a rear-view mirror as defined in claim 1, further comprising a constant-voltage circuit to provide safety when voltage is applied to said EC panel, as well as a variable resistor for use in modifying and retrieving the voltage value which is supplied from said constant-voltage circuit.

4. An Electrochromic (EC) panel drive unit for a rear-view mirror as defined in claim 3, wherein said constant-voltage circuit contains a Zener diode.

5. An Electrochromic (EC) panel drive unit for a rear-view mirror as defined in claim 1, further comprising a short-circuit switch for the purpose of causing a short circuit between said first terminal and said second terminal of said EC panel.

6. An Electrochromic (EC) panel drive unit for a rear-view mirror as defined in claim 5, wherein said short-circuit switch is cooperated with said second switch.

7. An Electrochromic (EC) panel drive unit for a rear-view mirror as defined in claim 6, wherein said short-circuit switch is used to provide a short circuit between said first terminal and said second terminal through a resistor.

8. An Electrochromic (EC) panel drive unit for a rear-view mirror as defined in claim 1, wherein said DC voltage is supplied from a lithium battery.

* * * * *